United States Patent  [11] 3,622,380

[72] Inventor Fredrick D. Williams
  Hancock, Mich.
[21] Appl. No. 800,294
[22] Filed Feb. 18, 1969
[45] Patented Nov. 23, 1971
[73] Assignee Universal Oil Products Company
  Des Plaines, Ill.

[54] COLORING SOLUTION AND USE THEREOF
  10 Claims, No Drawings
[52] U.S. Cl. ..................................................117/116 UE,
  8/6.5, 260/88.5
[51] Int. Cl. ..................................................... B44d 3/48
[50] Field of Search.......................................... 8/6.5, 173,
  93; 117/161 UE; 260/88.5

[56] References Cited
UNITED STATES PATENTS
| | | | |
|---|---|---|---|
| 1,872,470 | 8/1932 | Rivat............................ | 8/31 |
| 2,632,710 | 3/1953 | Mayers......................... | 8/6.5 UX |
| 2,772,137 | 11/1956 | Weber.......................... | 8/6.5 |
| 3,075,821 | 1/1963 | Goldemberg................. | 8/30 |

OTHER REFERENCES

Disereus, Chemical Technology of Dyeing and Printing, pages 436, Vol. 1, 1948, and pages 210 & 211, Vol. 2, 1951, pub. by Rheinhold Pub. Co., N.Y.C., TP893 D49pE & Gp 167.

*Primary Examiner*—Donald Levy
*Attorneys*—James R. Hoatson, Jr. and Bernard L. Kramer

ABSTRACT: Coloring of porous material by means of an aqueous solution of furfuryl alcohol, a catalyst selected from a compound of iron, nickel, cobalt, copper, zinc and cadmium, and a complexing agent. Specifically, inexpensive elm veneer is colored to resemble the more expensive walnut.

COLORING SOLUTION AND USE THEREOF

BACKGROUND OF THE INVENTION

Expensive furniture woods have certain physical properties which make them highly desirable. One of the most important of these is color. Some present practices in the industry stain only the surface of the wood. However, when such wood is scratched or damaged, the unstained wood below the surface is exposed and detracts from the attractiveness of the furniture. Accordingly, there is a need for a method of imparting color uniformly throughout the entire thickness of the wood.

A number of difficult problems are encountered endeavoring to obtain uniform coloring. Although are not methods have been proposed heretofore, these methods are not completely satisfactory in accomplishing uniform penetration of the color throughout the wood. Also, the coloring must be as natural looking as the product it is intended to resemble and therefore the grain and natural figure of the wood must not be hidden. Another problem is that the coloring process must be accomplished within a practical time. Some of the processes of the prior art are based on the use of organic dyes. The prior aft also discloses the use of solutions containing furfuryl alcohol with various other ingredients, primarily as impregnating solutions to coat porous materials with a resin which will render the porous materials resistant to acids and bases.

A problem associated with the use of furfuryl alcohol solutions containing a catalyst to that such solutions have a short pot life. In other words, polymerization of the furfuryl alcohol occurs prematurely and thus results in unsatisfactory coating of the porous materials. This problem is even more acute when it is desired to effect uniform coating throughout the porous material.

DESCRIPTION OF THE INVENTION

It now has been found that uniform coloring of a porous material may be effected by utilizing a novel coloring solution as will be hereinbefore set forth.

In one embodiment the present invention comprises an aqueous solution of furfuryl alcohol and a catalyst selected from the group consisting of a compound of iron, nickel, cobalt, copper, zinc, and cadmium, and a complexing agent.

In another embodiment the present invention relates to the method of coloring s porous material which comprises contacting said porous material with an aqueous solution as defined above, heating to a temperature of from about 150° to 350° F. and subsequently drying the colored material.

The present invention is particularly applicable for the coloring of inexpensive woods. A particular application is in the coloring of elm veneer to resemble walnut. Other applications, with suitable modifications, may include the coloring of natural birch to mahogany, the coloring of maple to walnut, mahogany or rose-wood, the coloring of white pine, etc. The process is particularly applicable to the coloring of sapwood to resemble the heart wood and thus permit the satisfactory use of the sapwood either alone or interchangeably with the heart wood. Here again with suitable modifications, the features of the present invention may also be used with other porous materials as, for example, paper, textiles, leather, plastic, etc.

From the above mentioned it will be noted that the coloring solution of the present invention contains furfuryl alcohol. Under the controlled conditions as herein set forth and in combination with the other ingredients of the solution, polymerization of the furfuryl alcohol is inhibited until impregnation, following which the polymerization is accelerated to produce the desired colored resin. The desired color is produced by a correlation of the critical features of the present invention, as will be hereinafter set forth in detail. Furfuryl alcohol is infinitely soluble in water and, while it may be used in a high concentration, it has been found that the high concentration of furfuryl alcohol reduces the pot life of the solution. Accordingly it is preferred that the furfuryl alcohol be used in a lower concentration, which concentration must be sufficient to effect the desired coloration within a practical time. This embodiment of the invention, the furfuryl alcohol is used in the aqueous solution in a concentration of from about 8 percent to about 30 percent by weight and still more particularly in a concentration of from about 10 percent to about 20 percent by weight.

Polymerization of the furfuryl alcohol is accelerated by a catalyst contained in the solution. In general, the catalyst will be selected from a compound and more particularly a salt of iron, nickel, cobalt, copper, zinc and cadmium. A preferred catalyst is a salt of iron and more particularly ferric nitrate. Other salts of iron may be used including ferric chloride, ferrous chloride, ferrous nitrate, ferrous sulfate, ferric sulfate, including the hydrates of the iron salts. In still another embodiments, organic salts of iron may be used as, for example, ferrous acetate, ferric acetate, ferrous citrate, ferrous formate, ferric oleate, etc. However, it it understood that these different salts are not necessarily equivalent in a specific application. The corresponding salts of the other metals set forth above are comprised within the present invention and, in the interest of brevity, are not being repeated herein because they are readily ascertainable. In general, a salt of iron and particularly ferric nitrate is preferred, with a salt of copper and particularly copper sulfate being next in preference.

Here again the concentration of the ingredient is important. High concentration of the catalyst will cause premature polymerization and too short a pot life. On the other hand, a sufficient concentration of the catalyst is required in order to accomplish the desired polymerization. In a preferred embodiment the catalyst is used in a concentration of from about 0.1 percent to about 10 percent by weight and more particularly of from about 0.2 percent to about 5 percent by weight of the aqueous solution. In combination with the other ingredients of the solution the catalyst functions to effect the desired polymerization and still produce a satisfactory pot life to permit practical application of the solution.

Even with the controlled concentrations of furfuryl alcohol and catalyst as hereinbefore set forth, premature polymerization and nonuniform coloration occurs. As an essential feature of the present invention a complexing agent is incorporated in the solution. Any suitable complexing agent may be used. A particularly preferred complexing agent is lactic acid. The lactic acid preferably is used in a concentration of from about 0.1 percent to about 10 percent and more particularly in a concentration of from about 0.2 percent to about 5 percent by weight of the aqueous solution. However, in some cases higher or lower concentrations may be employed but it has been found that concentrations within the range specified produces satisfactory results. Another complexing agent is ammonium chloride which is used in a lower concentration than specified above and thus may be from about 0.1 percent to about 2 percent by weight of the solution. In forming the aqueous solution, water will be used in concentration of from about 50 percent to about 91.8 percent and more particularly in a concentration of from about 70 percent to about 89.3 percent by weight of the final solution.

The specific ingredients and concentrations as hereinbefore set forth form aqueous solutions which are satisfactory to obtain uniform color. It is understood that the specific concentrations of the compound in a particular solution will be correlated for best results. For example, when a higher concentration of catalyst is used, a higher concentration of complexing agent also will be used. While these ingredients are referred to as catalyst and complexing agent, it appears that their functions are not limited by the particular descriptions but that a coordinated and mutually responsive activity occurs to produce the satisfactory results.

While the invention embodies the solution as hereinbefore described, it is understood that when advantages appear therefor, other suitable ingredients may be included in the solution. As an example, a small concentration of furfuraldehyde, generally less than 10 percent by weight, may be of advantage and an alcohol such as methanol, ethanol, propanol butanol, etc., may also be included in order to improve solubility of the furfuraldehyde in the solution. When the additional ingredient is included, it is understood that the concentration of the other ingredients as hereinbefore set forth will modified accordingly.

In a preferred embodiment of the present invention, the furfuryl alcohol is used in a comparatively low concentration. However, the use of the low concentration of furfuryl alcohol, in turn, requires heating at an elevated temperature in order to complete the coloration within practical time limits. In a preferred method soaking of the veneer in the solution is effected at ambient or mild temperature and then is followed by heating to the required higher temperature. Any suitable higher temperature may be used and generally will be within the range from about 150° to about 350° F., although higher or lower temperatures may be used when satisfactory for the purpose. Here again the specific temperature will be correlated with the specific concentrations of the ingredients in the aqueous solution. Lower concentrations of furfuryl alcohol require higher temperatures. Also, the temperature of heating will be correlated with the time, these being inversely proportional. The time of heating may range from about 5 minutes to 12 hours or more which as stated above, will be correlated with the specific temperature of heating.

The coloration is effected in any suitable manner and will depend upon the particular porous material being treated and form thereof. In a particularly preferred method, the logs are cut into veneer and the veneer then is subjected to the coloring treatment. It is general practice to cut logs into veneer and roll the same into loose rolls, which subsequently are trimmed and cut into strips of any desired width. While the green veneer may in some cases be used, it is preferred that the veneer is dried to a moisture content of from about 5 to 30 percent and still more particularly from about 7 percent to about 15 percent. The drying may be effected in any suitable manner, including in the air, oven, steam chest, electronically, etc. Here again, the temperature will be correlated with the time and also with the specific method of drying.

In a preferred method, the veneer then is soaked in the aqueous solution of the present invention. While the soaking may be effected at an elevated temperature, of preferably from about 150° to about 350° F., a preferred method is to effect the soaking at an ambient or low elevated temperature and then subject the veneer to heating at about 150° to about 350° F. The high temperature accelerates and completes the polymerization reaction. The soaking may be effected in any suitable equipment, including closed or open containers, which are heated to the desired temperature in any suitable manner. When desired the coloring treatment may be effected under vacuum. In a preferred method the veneer is arranged in a vertical position in the solution as this seems to reduce the possibility of checking, cracking, buckling or the like. It is understood that any other suitable method of contacting the veneer with the solution may be used. As set forth above, the time of soaking will be correlated with the temperature and may range from 5 minutes to 12 hours or more and preferably of from 6 minutes to 6 hours. The temperature and time of soaking will depend on the particular equipment used and may include the combination of initial heating, subsequent soaking at an elevated temperature and final heating to a higher temperature.

Following the soaking treatment, the veneer is removed from contact with the solution and subsequently dried. It is obvious that excess solution is first drained from the veneer prior to removal from the contact zone. Drying of the colored veneer is effected in any suitable manner which may include air, oven, steam chest, electronic or whatever suitable equipment is available or a combination of these. The drying temperature may range from ambient to 500° F. depending upon the method employed. The time of drying will depend upon the particular temperature. Longer time obviously is required in air drying and this may range up to several days or more. Heat or electronic drying may range from 0.5 to 12 hours or more. The drying may be effected under vacuum if desired.

In addition to accomplishing uniform coloring throughout the veneer, the process of the present invention also imparts a coating which renders the wood resistant to acids or bases and this even further improves the value of the final produce.

The following examples are introduced to further illustrate the invention but not with the intention of unduly limiting the same.

EXAMPLE I

A coating solution was formed of the following composition: 100 ml. furfuryl alcohol, 2.4 g. of ferric nitrate, 10 ml. lactic acid and 800 ml. of water. This solution was stable at room temperature and was used for the coloring of elm veneer.

Samples of elm veneer of 1 by 1 inch were soaked in the above solution. The samples were soaked for a period of 2 hours at ambient temperatures and then heating for 45 minutes at about 260° F. The light color of the elm veneer was converted to a walnut color and retained the natural grain.

EXAMPLE II

A series of evaluations was made with 1 by 1 inch elm veneer samples, using solutions containing increasing concentrations of copper sulfate as the catalyst. These concentrations ranged from 0.25 to 5 percent by weight. The solutions containing the lower concentrations of copper sulfate produced lighter colored product, whereas the solutions containing the higher concentrations produced darker colored products.

This demonstrates another advantage to the present invention whereby the color of the final product may be varied to suit the particular hue desired.

EXAMPLE III

Another series of evaluations was made in the same manner except that the solutions contained increasing amounts of ferric chloride. Here again it was found that the color of the product increased in darkness with increasing amounts of ferric chloride in the aqueous solution.

EXAMPLE IV

Still another series of evaluations was made in which the aqueous solution contained both copper and iron salts in varying proportions. Here again the final color was dependent upon the concentrations of the salts used in the solution.

EXAMPLE V

Another series of evaluations was made in substantially the same manner except that the concentration of furfuryl alcohol was double that used in the previous examples. Substantially the same results were obtained as reported in the previous examples.

I claim as my invention:

1. The method of coloring wood which comprises contacting said wood with an aqueous solution of furfuryl alcohol, a catalyst selected from the group consisting of a compound of iron, nickel, cobalt, copper, zinc and cadmium, and a complexing agent selected from the group consisting of lactic acid and ammonium chloride, heating to a temperature of from about 150° to about 350° F. and drying the colored wood.

2. The method of claim 1 wherein said complexing agent is lactic acid.

3. The method of claim 1 wherein said complexing agent is ammonium chloride.

4. The method of claim 1 wherein said catalyst is ferric nitrate.

5. The method of claim 1 wherein said catalyst is ferric chloride.

6. The method of claim 1 wherein said catalyst is copper sulfate.

7. The method of the claim 1 wherein said solution comprises from about 8 to about 10 percent by weight of furfuryl alcohol, from about 0.2 to about 10 percent by weight of catalyst, from about 0.1 percent to about 10 percent by weight of complexing agent, and from about 50 to about 91.8 percent by weight of water.

8. The method of claim 7 wherein said solution comprises from about 10 to about 20 percent by weight of furfuryl alcohol, from about 0.2 to about 5 percent by weight of catalyst, from about 0.2 to about 5 percent by weight of complexing agent and from 70 to about 88.6 percent by weight of water.

9. The method of claim 9 wherein said wood is elm veneer.

10. The method of claim 9 wherein said elm veneer is dried to a moisture content of from about 5 to about 30 percent prior to the contacting with said solution.

* * * * *